United States Patent [19]

Klukowski

[11] Patent Number: 5,755,602
[45] Date of Patent: May 26, 1998

[54] NAUTICAL PROPULSION DEVICE

[76] Inventor: Slawomir Klukowski, 19 bis, rue Eugene Carriere, 75018 Paris, France

[21] Appl. No.: 580,128

[22] Filed: Dec. 28, 1995

Related U.S. Application Data

[63] Continuation of PCT/FR93/00789, Aug. 4, 1993.

[51] Int. Cl.$^6$ ................................................. B63H 11/00
[52] U.S. Cl. ............................. 440/38; 440/90; 114/270
[58] Field of Search ............................. 114/270; 440/38, 440/90–94

[56] References Cited

U.S. PATENT DOCUMENTS

| | | |
|---|---|---|
| 3,595,199 | 7/1971 | Faxas . |
| 3,628,493 | 12/1971 | Headrick ........................ 114/270 |
| 3,688,731 | 9/1972 | Houle ............................ 114/270 |
| 4,437,841 | 3/1984 | Stallman ........................ 440/38 |
| 4,459,117 | 7/1984 | Jordan .......................... 440/38 |

FOREIGN PATENT DOCUMENTS 2690385  10/1993  France ........................ 440/38

*Primary Examiner*—Stephen Avila
*Attorney, Agent, or Firm*—Henry M. Bissell

[57] ABSTRACT

A nautical propulsion device for amphibious vehicle wherein the rims 2 of the driving wheel tires 1 are provided with vanes 3 rotating with the wheels. Each of these wheels comprises, in the region where the liquid leaves the vanes 3, an open delivery channel 4 adjacent to and facing this region, and a delivery pipe 5 with its outlet facing backwards with respect to the desired travelling direction. If the driving wheels are also guiding wheels, the vehicle may be steered through the water simply by turning the wheels without any other drive being required. The wheels act as pumps using the reactional fare to propel the vehicle during nautical use.

15 Claims, 2 Drawing Sheets

NAUTICAL PROPULSION DEVICE

CROSS REFERENCE TO RELATED APPLICATION

This application is a continuation of PCT application No. FR93/00789, filed August 4, 1993, from which priority is claimed.

BACKGROUND OF THE INVENTION AND PRIOR ART

The present invention relates to a nautical propulsion device for an amphibious vehicle. Amphibious vehicles currently are propelled in the water either by screws or by hydrojets.

Each amphibious vehicle has two separate mechanisms, one for propelling the wheels for travel on land, and the other for nautical propulsion. The device according to the invention makes it possible to have to drive just the wheels of the vehicle (which work like pumps as soon as they are immersed in water).

From the U.S. Pat. No. 3,595,199 issued to Faxas et al, there is known a nautical propulsion device for an amphibious vehicle in which the rims for the tires of the driving wheels are equipped with vanes which turn with the wheels and which accelerate the liquid towards the inlet of the delivery means, this delivery means includes an ejection nozzle orientated in the opposite direction to the desired direction of travel.

SUMMARY OF THE INVENTION

According to the invention, in order to improve good operation, the nautical propulsion device includes a wheel, the rim of which is equipped with vanes which turn at the same time as the driving wheel. The vanes produce a flow of liquid which is directed towards the inlet of the delivery channel. The ejection of the water from the delivery pipe is orientated so that it propels the vehicle in the water. For good operation of the device, it is necessary to lock or to control the differential of the vehicle.

BRIEF DESCRIPTION OF THE DRAWINGS

Further objects and advantages of the invention will become apparent from the following description and claims, and from the accompanying drawings, wherein:

DESCRIPTION OF THE PREFERRED EMBODIMENTS

Figure 1:
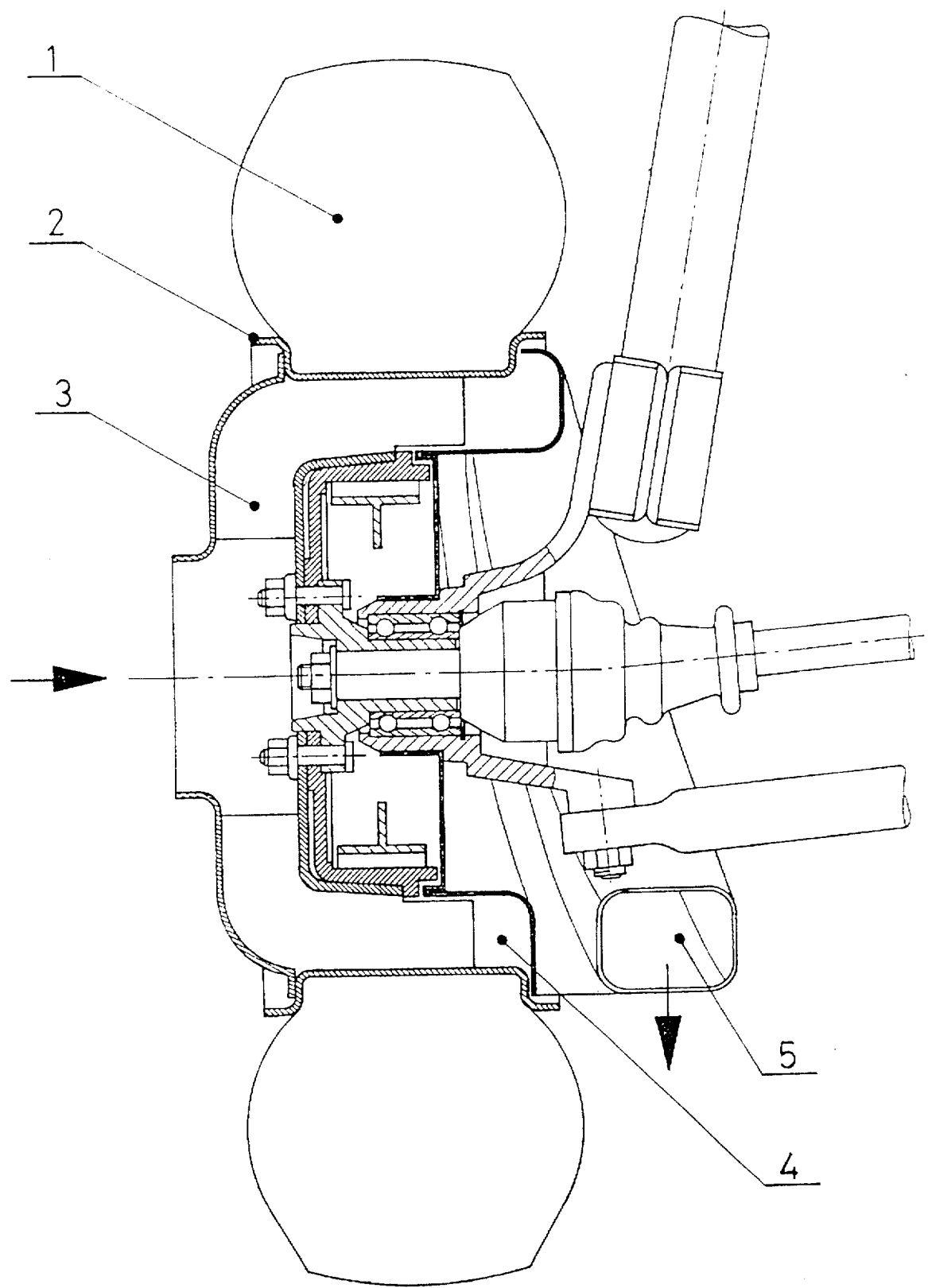
FIG. 1 represents the device according to a first embodiment of the invention in section.

Referring now to the drawings, the plane of the nautical propulsion device includes: the tire 1 with its rim 2. The rim 2 is equipped with vanes 3. In the region where the liquid leaves the vanes 3, there is a helical delivery channel 4 which is contiguous with and open towards this region, followed by a delivery pipe 5 (optionally ending in an ejection nozzle) orientated in the opposite direction to the desired direction of travel. The principle by which the rim is fastened, the wheel is driven, braking is achieved etc. is identical to that of an ordinary land vehicle.

Nautical propulsion is achieved as follows:

The vanes 3, turning with the rim 2 and the tire 1 work like a pump and accelerate the liquid towards the delivery channel 4. The liquid then leaves the delivery pipe 5 with the speed thus acquired, propelling the vehicle by means of the reaction force.

Figure 2:
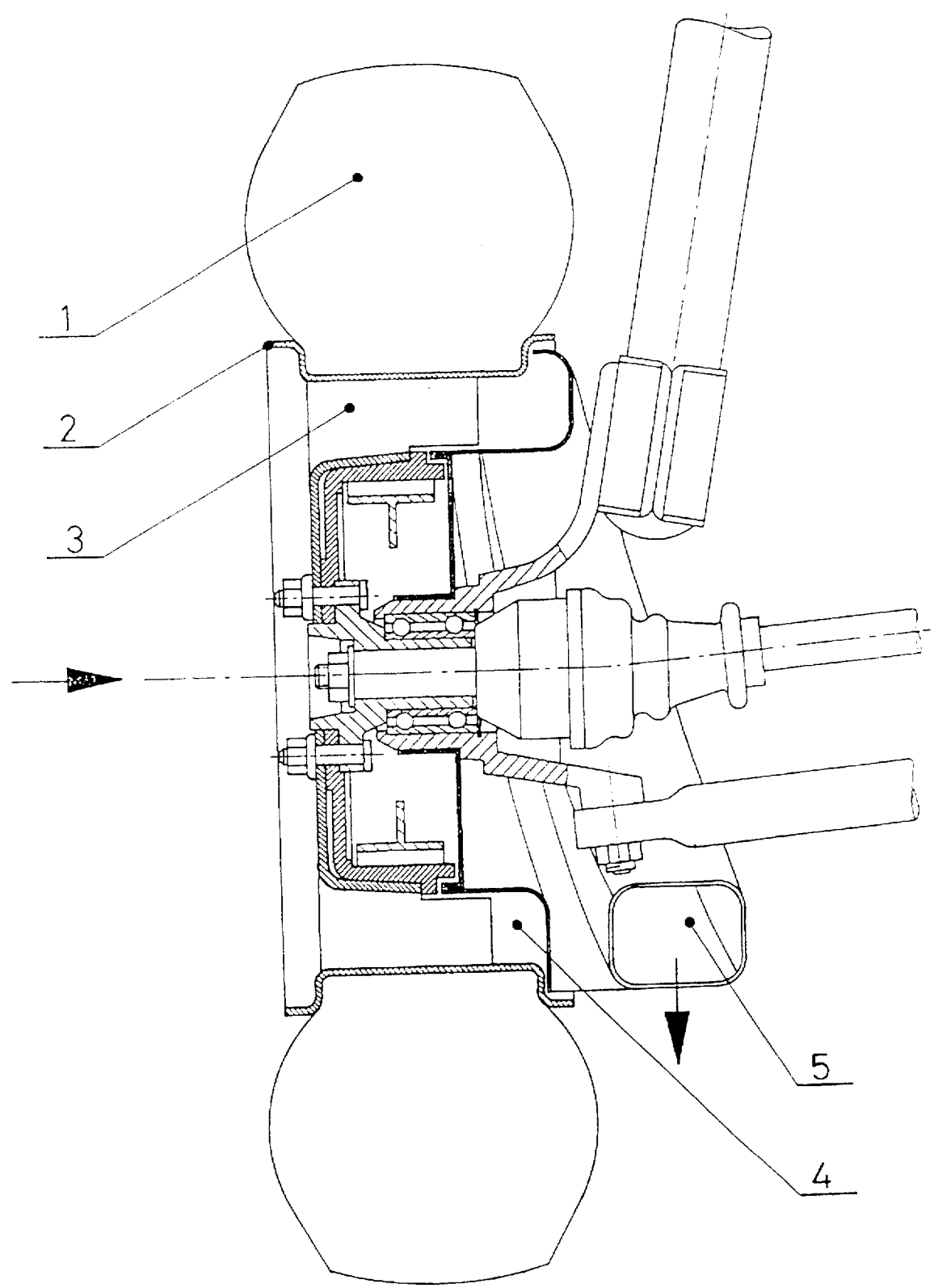
FIG. 2 shows a second embodiment of the invention.

The acceleration of the liquid may take place in the pump using the principle of axial, centrifugal or helico-centrifugal flow. FIG. 1 shows the helico-centrifugal principle, and FIG. 2 the axial principle.

In the case of an amphibious vehicle with four-wheel drive, four propulsion units are obtained. By turning the steering wheel, the wheels, and thus the direction of the water jets leaving the delivery pipes 5 of the guiding wheels are orientated, which makes it possible to steer the amphibious vehicle on the water without any other device (rudder, spoiler, etc.) being necessary.

For good operation of the propulsion units according to the invention, it is necessary to block or to control the differential. Controlling the differential (optionally) makes it possible to enhance the manoeuvrability of the vehicle in turns.

The device according to the invention may be used as a pumping means by coupling discharge hoses to the delivery pipe(s) 5, provided that the wheels are immersed.

While there have been shown and described what are presently considered to be the preferred embodiments of the invention, il will be apparent to those skilled in the art that various changes and modifications can be made herein without departing from the scope of the invention as defined in the appended claims.

What I claim is:

1. A nautical propulsion device for an amphibious vehicle in which the rims for the tires of the driving wheels are equipped with vanes, which turn with the wheels and which accelerate the liquid towards the inlet of a delivery means, this delivery means including an ejection nozzle orientated in the opposite direction to the desired direction of travel, wherein each wheel thus equipped includes, as a delivery means, in the region where the liquid leaves the vanes, a helical delivery channel which is contiguous with and open towards said region, followed by a delivery pipe ending in said ejection nozzle.

2. Nautical propulsion apparatus for an amphibious vehicle, said apparatus comprising:
   a plurality of driving wheels mounted on the vehicle for propelling the vehicle on land, each driving wheel having a tire mounted on a rim;
   at least one of said rims defining a region extending through the wheel from side to side and situated radially inward from said tire, said region including a passage for liquid flow;
   a plurality of vanes mounted within said region for rotation with the wheel to accelerate liquid flow through said passage;
   liquid delivery means mounted inboard of and adjacent said passage for receiving liquid accelerated by said vanes, said delivery means having an inlet region and an ejection nozzle orientated in a direction opposite to the desired direction of travel;
   said delivery means further including in said inlet region a helical delivery channel having an increasing cross-section and being contiguous with and open toward said inlet region; and
   a delivery pipe connected between said channel and said ejection nozzle.

3. Nautical propulsion apparatus for an amphibious vehicle, said apparatus comprising:
   a plurality of driving wheels mounted on said vehicle for propelling the vehicle on land;
   at least one driving wheel including a rim and tire mounted thereon;

said rim having a circumferential region situated radially inward from the tire and containing a passage for liquid flow therethrough in a direction inboard of the vehicle;

liquid delivery means mounted inboard of said passage for receiving liquid therefrom and redirecting it in a direction opposite from the desired direction of travel;

a plurality of vanes mounted within said passage for rotation with the wheel to accelerate liquid flow through the wheel toward said liquid delivery means.

4. The apparatus of claim 3 wherein said passage includes an inlet at its outboard end and an outlet adjacent said delivery means for controlling the path of liquid flow through said passage.

5. The apparatus of claim 4 wherein said inlet is formed with a reduced diameter relative to said passage and wherein said vanes include a radially-directed portion extending from the vicinity of said inlet and connecting with an axially-directed portion at the radially outward end of said radial portion for developing helico-centrifugal liquid flow through said passage.

6. The apparatus of claim 3 wherein said vanes are mounted in said passage to develop axial flow of the liquid being accelerated thereby.

7. The apparatus of claim 3 wherein said vanes are mounted in said passage to develop centrifugal flow of the liquid being accelerated thereby.

8. Nautical propulsion apparatus for an amphibious vehicle, said apparatus comprising:

a plurality of driving wheels mounted on said vehicle for propelling the vehicle on land;

at least one driving wheel including a rim and tire mounted thereon;

said rim having a circumferential region situated radially inward from the tire and containing a passage for liquid flow therethrough in a direction inboard of the vehicle;

liquid delivery means mounted inboard of said passage for receiving liquid therefrom and redirecting it in a direction opposite from the desired direction of travel; and a pump mounted within said region for propelling liquid through said passage.

9. The apparatus of claim 8 wherein said pump includes a plurality of vanes mounted to rotate with the wheel for accelerating liquid through the pump in an inboard direction into said delivery means.

10. The apparatus of claim 9 wherein the vanes of said pump are configured to produce centrifugal flow of the liquid accelerated by said pump.

11. The apparatus of claim 9 wherein the vanes of said pump are configured to produce axial flow of the liquid accelerated by said pump.

12. The apparatus of claim 9 wherein the vanes of said pump are configured to produce helico-centrifugal flow of the liquid accelerated by said pump.

13. The apparatus of claim 8 wherein said liquid delivery means includes an inlet mounted adjacent the outlet of said passage, a helical delivery channel beginning adjacent said inlet and increasing in cross-sectional area with distance therefrom, and an ejection nozzle mounted to eject liquid therefrom in a direction opposite to the desired direction of travel.

14. The apparatus of claim 13 wherein said delivery means further includes a delivery pipe positioned between the delivery channel and the ejection nozzle.

15. The apparatus of claim 8 wherein said pump is integral with said rim.

* * * * *